United States Patent Office 3,153,067
Patented Oct. 13, 1964

3,153,067
SUBSTITUTED OCTAHYDROANTHRACENES
Thomas Lynn Fields, Pearl River, N.Y., Raymond George Wilkinson, Montvale, N.J., and Andrew Steven Kende, Hartsdale, N.Y., assignors to American Cyanamid Company, Stamford, Conn., a corporation of Maine
No Drawing. Filed Apr. 7, 1961, Ser. No. 101,373
2 Claims. (Cl. 260—590)

This invention relates to new organic compounds and, more particularly, is concerned with novel substituted 2-carboxy-, 2-carbalkoxy-, and 2-formyl-4,10-dioxo-1,2,3,4,4a,9,9a,10-octahydroanthracenes, and to methods of preparing these novel compounds. The novel substituted 2-carboxy-, 2-carbalkoxy-, and 2-formyl-4,10-dioxo-1,2,3,4,4a,9,9a,10-octahydroanthracenes of the present invention may be represented by the following general formula:

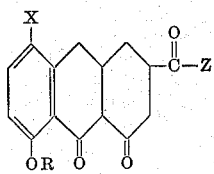

wherein X is halogen, R is hydrogen, lower alkyl, or phenyl lower alkyl, and Z is hydrogen, hydroxy, or lower alkoxy. Suitable lower alkyl and lower alkoxy groups contemplated by the present invention are those having up to about 6 carbon atoms. Suitable phenyl lower alkyl groups are, for example, benzyl, phenethyl, etc. Halogen is exemplified by chlorine and bromine.

The novel compounds of the present invention are in general, crystalline solids, insoluble in water, but soluble in organic solvents such as lower alkanols, acetone, ethyl acetate, and the like.

The novel compounds of the present invention are particularly useful as chelating, complexing or sequestering agents for polyvalent metallic ions. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent from these compounds.

The novel compounds of the present invention are biologically active and have been found to possess antifungal activity. The antifungal spectrum of the novel compounds of the present invention, representing the amount required to inhibit the growth of various typical fungi, was determined in a standard manner by the agar dilution streak technique. The minimal inhibitory concentrations, expressed in milligrams per milliliter, of two typical compounds of the present invention against various test organisms is reported in the table below:

TABLE I

| Organism | 8-chloro-1,2,3,4,4a,9,9a,10-octahydro-5-benzyloxy-4,10-dioxo-2-anthroic acid | 8-chloro-1,2,3,4,4a,9,9a,10-octahydro-5-hydroxy-4,10-dioxo-2-anthraldehyde |
|---|---|---|
| Trichophyton mentagrophytes | <0.062 | 0.125 |
| Microsporum gypseum | <0.062 | 0.125 |
| Myrothecium verrucaria | | 0.125 |

Furthermore, the 8-chloro-1,2,3,4,4a,9,9a,10-octahydro-5-hydroxy-4,10-dioxo-2-anthraldehyde inhibits the growth of Bacillus subtilis at a concentration of 0.062 mg./ml.

The novel compounds of the present invention are also useful in the synthesis of physiologically active antibiotics of the tetracycline series. For example, a substituted 2-formyl - 4,10 - dioxo-1,2,3,4,4a,9,9a,10-octahydroanthracene may be converted to the corresponding α-dimethylamino-4,10-dioxo-1,2,3,4,4a,9,9a,10-octahydroanthracene-2-acetic acid by means of a standard Strecker synthesis. This intermediate may then be converted to its corresponding acyl halide by treatment with a suitable agent such as oxalyl chloride or thionyl chloride, or alternatively, the mixed carboxylic-carbonic anhydride derivative may be prepared in the usual manner. The corresponding acyl malonate may then be prepared by treating the intermediate acyl derivative with sodium or magnesium diethylmalonate. The acyl malonate may then be cyclized with a strongly basic condensing agent such as sodium hydride, sodium metal, an alkali metal alkoxide, or the like, to the ethyl ester of the corresponding substituted 4-dimethylamino - 1,2,3,4,4a,5,5a,6,11,11a,12,12a - dodecahydro - 1,3,11,12 - tetraoxonaphthacene-2-carboxylic acid. This dodecahydronaphthacene may then be treated to remove the carbethoxy group by strong acid hydrolysis, or may be converted to the 2-carboxamido derivative by treating with alcoholic ammonia at 70°–110° C. in a sealed vessel.

The novel compounds of the present invention are prepared by a series of reactions starting with the appropriately substituted 1,2,3,4-tetrahydro-4-oxo-2-naphthaleneacetaldehydes disclosed and claimed in the copending application of Raymond G. Wilkinson et al., Serial No. 821,093, filed June 18, 1959, now U.S. Patent No. 3,102,914. In accordance with the present invention, an appropriately substituted 1,2,3,4-tetrahydro-4-oxo-2-naphthaleneacetaldehyde is first converted to the corresponding 2 - (1,2,3,4-tetrahydro-4-oxo - 2 - naphthylmethyl)succinic acid by treatment with a cyanoacetic ester and an alkali metal cyanide. This succinic acid is then converted to the corresponding 2-(1,2,3,4-tetrahydro-4-oxo - 2 - naphthylmethyl)succinic anhydride by treatment with a suitable dehydrating agent such as acetic anhydride. The mono(lower)alkyl esters of the 2-(1,2,3,4-tetrahydro-4-oxo-2-naphthylmethyl)succinic acid are then obtained either by subjecting the anhydride to alcoholysis with an alkali metal alkoxide of a lower alkanol or by treating the anhydride with a lower alkanol in the presence of triethylamine at room temperature. The resulting mixture of 4-alkyl and 1-alkyl 2-(1,2,3,4-tetrahydro-4-oxo-2-naphthylmethyl)succinates is then separated by standard procedures such as fractional crystallization. The 2-(1,2,3,4-tetrahydro - 4 - oxo-2-naphthylmethyl)succinic acids, anhydrides, monoesters, and diesters are also new compounds and form part of the subject matter of the present invention. The succinic acids, monoesters, and diesters of the present invention may be represented by the following general formula:

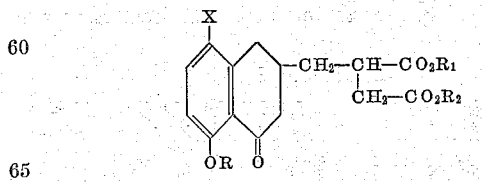

wherein X and R are as hereinbefore defined, and $R_1$ and $R_2$ are each hydrogen or lower alkyl.

The 4-alkyl 2-(1,2,3,4-tetrahydro-4-oxo - 2 - naphthylmethyl)succinate is then cyclized to the corresponding 1,2,3,4,4a,9,9a,10 - octahydro-4,10-dioxo-2-anthroic acid with a strongly basic condensing agent such as sodium hydride, sodium metal, an alkali metal alkoxide, or the like, in a neutral anhydrous solvent such as benzene, toluene, xylene, or the like, at a temperature of from 50° C. to 150° C. The 1,2,3,4,4a,9,9a,10-octahydro-4,10-dioxo-2-anthroic acid is then converted to the corresponding acyl halide by treatment with an agent such as oxalyl chloride, phosphorus pentachloride, phosphorus pentabromide, thionyl chloride, thionyl bromide, and the like. The intermediate acyl halide so formed is then converted to the final aldehyde product by a suitable reduction process. Catalytic hydrogenation has been found effective in achieving the final step. Gaseous hydrogen and a suitable catalyst such as a noble metal catalyst, e.g., palladium on barium sulfate, is preferably used. The reduction is preferably carried out in an inert organic solvent such as benzene, toluene, xylene, or the like, at temperatures ranging from about 70° C. to about 150° C.

The invention will be described in greater detail in conjunction with the following specific examples.

EXAMPLE 1

*2-(8-Chloro-5-Hydroxy-1,2,3,4-Tetrahydro-4-Oxo-2-Naphthylmethyl)Succinic Acid*

A solution of 2.39 g. (0.01 mole) of 8-chloro-5-hydroxy-1,2,3,4-tetrahydro-4-oxo-2-naphthaleneacetaldehyde, 0.63 g. (0.01 mole) of glacial acetic acid, 0.79 g. (0.01 mole) of pyridine and 1.13 g. (0.01 mole) of ethyl cyanoacetate in 50 ml. of absolute ethanol was refluxed under nitrogen. After one hour, 0.65 g. (0.01 mole) of potassium cyanide was added and the refluxing was continued for an additional hour. The reaction mixture was then concentrated in vacuo and the yellow crystalline residue was taken up in 100 ml. of glacial acetic acid:conc. hydrochloric acid::3:7, and refluxed overnight. Upon cooling, the white crystalline material which precipitated was collected on a filter, washed thoroughly with water, and dried in vacuo over potassium hydroxide pellets. The yield of the diastereomeric succinic acids was 2.50 g. (77% of theory), M.P. 177–182° C.

EXAMPLE 2

*Cis 2-(8-Chloro-5-Benzyloxy-1,2,3,4-Tetrahydro-4-Oxo-2-Naphthylmethyl)Succinic Acid*

In 50 ml. of 1 N sodium hydroxide was dissolved 1.40 g. of a mixture of diastereomeric 2-(8-chloro-5-hydroxy-1,2,3,4-tetrahydro-4-oxo-2-naphthylmethyl) succinic acids. To this solution was added 3.6 g. of benzyl chloride and the resulting mixture was refluxed under nitrogen for one hour. The reaction mixture was cooled and extracted thrice with 20 ml. portions of ethyl acetate. The aqueous layer was removed, acidified, and the tan oil which separated was extracted into ethyl acetate. The organic layer was washed with water, dried over anhydrous magnesium sulfate, and concentrated in vacuo to an oil which solidified upon trituration with a small amount of ethyl acetate. This crude solid was recrystallized from 65 ml. of ethyl acetate whereby there was obtained 390 mg. (43% yield) of cis 2-(8-chloro-5-benzyloxy-1,2,3,4 - tetrahydro - 4 - oxo - 2 - naphthylmethyl)succinic acid, M.P. 194–196° C. Recrystallization again from ethyl acetate raised the melting point to 195.5–197° C. Concentration of the mother liquor gave 1.23 g. of a mixture of the cis and trans isomers as a gummy solid.

EXAMPLE 3

*Cis 2-(8-Chloro-5-Benzyloxy-1,2,3,4-Tetrahydro-4-Oxo-2-Naphthylmethyl)Succinic Anhydride*

In 90 ml. of acetic anhydride was dissolved 5.7 g. of cis 2-(8-chloro-5-benzyloxy-1,2,3,4-tetrahydro-4-oxo-2-naphthylmethyl)succinic acid, and the resulting solution was refluxed for one hour and then concentrated to an oil in vacuo. Trituration of this residual oil yielded tan crystals. Recrystallization of this material from 30 ml. of toluene gave 4.3 g. (81% yield) of the desired anhydride, M.P. 147–149° C. A second recrystallization from toluene raised the melting point to 149.5–150° C.

EXAMPLE 4

*Trans 2-(8-Chloro-5-Benzyloxy-1,2,3,4-Tetrahydro-4-Oxo-2-Naphthylmethyl)Succinic Anhydride*

The crude residue (4.3 g.) remaining after benzylation of 4.6 g. of the diastereomeric 2-(8-chloro-5-hydroxy-1,2,3,4-tetrahydro-4-oxo-2-naphthylmethyl)succinic acids and separation of the pure cis benzyloxy acid was dissolved in 25 ml. of acetic anhydride and refluxed for one hour. The dark brown solution was concentrated to a tan solid in vacuo. Recrystallization of this material from 60 ml. of toluene gave 1.25 g. of the trans anhydride, M.P. 184–186° C. An additional recrystallization from toluene raised the melting point to 187.5–189° C.

EXAMPLE 5

*Trans 2-(8-Chloro-5-Benzyloxy-1,2,3,4-Tetrahydro-4-Oxo-2-Naphthylmethyl)Succinic Acid*

A suspension of 100 mg. of the trans anhydride in 5 ml. of water and 1.5 ml. of 1 N sodium hydroxide was warmed on a steam bath for 15 minutes. The clear solution was cooled and acidified. The gummy solid which precipitated was taken up in ethyl acetate, washed with water, and concentrated to a solid in vacuo. Recrystallization of this material gave 68 mg. of the desired trans diacid, M.P. 143–145° C.

EXAMPLE 6

*Cis 4-Methyl and 1-Methyl 2-(8-Chloro-5-Benzyloxy-1,2,3,4-Tetrahydro-4-Oxo-2-Naphthylmethyl)Succinates*

A suspension of 1.0 g. (2.5 mmoles) of cis 2-(8-chloro-5-benzyloxy-1,2,3,4-tetrahydro-4-oxo-2-naphthylmethyl) succinic anhydride, 0.5 ml. (12.5 mmoles) of methanol, and 252.5 mg. (2.5 mmoles) of triethylamine in 25 ml. of benzene was stirred at room temperature. A clear solution was obtained after ten minutes. The reaction mixture was allowed to stir an additional hour and then it was diluted with 30 ml. of ethyl acetate. The solution was washed with 1 N hydrochloric acid and then with water. The solution was then concentrated in vacuo to a gum which on trituration with ether gave one gram of a mixture of the crystalline 4-methyl and 1-methyl esters. Fractional crystallization from toluene yielded 324 mg. of essentially pure 4-methyl ester, M.P. 138.5–140° C., and 90 mg. of essentially pure 1-methyl ester, M.P. 148–150°C.

EXAMPLE 7

*Cis 8-Chloro-5-Benzyloxy-1,2,3,4,4a,9,9a,10-Octahydro-4,10-Dioxo-2-Anthroic Acid*

A suspension of 108 mg. (0.25 mmole) of cis 4-methyl 2-(8-chloro-5-benzyloxy-1,2,3,4-tetrahydro-4-oxo-2-naphthylmethyl)succinate and 200 mg. of sodium hydride in oil in 10 ml. of sodium dried toluene was refluxed in a nitrogen atmosphere for 30 hours. The yellow suspension was cooled in an ice bath and the excess sodium hydride was decomposed by the cautious addition of glacial acetic acid. The reaction mixture was then diluted with 10 ml. of ethyl acetate and the clear solution was washed with 10 ml. of 1 N hydrochloric acid. The organic layer was separated, washed thrice with 10 ml. portions of water, and dried over anhydrous magnesium sulfate. The solution was concentrated in vacuo and the residual gum was slurried in ether. The yellow crystals which formed were collected on a filter, washed with ether, and dried in vacuo at 60° C. The yield of crude tricyclic acid was 25 mg., M.P. 191–194° C. Recrystallization from toluene raised the melting point to 201–203° C. Zinc dust distillation of this material gave anthracene, identified by ultraviolet absorption.

EXAMPLE 8

Cis 8-Chloro-5-Benzyloxy-1,2,3,4,4a,9,9a,10-Octahydro-4,10-Dioxo-2-Anthroic Acid A suspension of 1.03 g. (2.5 mmoles) of a mixture of the isomeric cis 4-methyl and 1-methyl succinic esters and 2.0 g. of sodium hydride in oil in 100 ml. of sodium dried toluene was refluxed in a nitrogen atmosphere for 18 hours. The yellow suspension was cooled in an ice bath and the excess sodium hydride was decomposed by the cautious addition of glacial acetic acid. The reaction mixture was then diluted with 100 ml. of ethyl acetate and the clear solution was washed with 100 ml. of 1 N hydrochloric acid. The organic layer was separated, washed thrice with water, and dried over anhydrous magnesium sulfate. The solution was concentrated in vacuo to an oil. The oil was dissolved in 15 ml. of diethyl ether and upon standing at room temperature yellow crystals were deposited. The yield of the crude cis anthroic acid was 200 mg. An analytical sample was obtained by recrystallization from toluene, M.P. 202–204° C. The infrared and ultraviolet spectra of this material was identical to that obtained by cyclization of the pure cis 4-methyl succinate.

EXAMPLE 9

Cis 8-Chloro-5-Hydroxy-1,2,3,4,4a,9,9a,10-Octahydro-4,10-Dioxo-2-Anthroic Acid A suspension of 85 mg. (0.218 mole) of cis 8-chloro-5-benzyloxy-1,2,3,4,4a,9,9a,10-octahydro-4,10-2-anthroic acid in 3.6 ml. of a 1:1::conc. hydrochloric:glacial acetic acid mixture was refluxed in a nitrogen atmosphere for one hour. A clear yellow solution was obtained after 20 minutes. On cooling to room temperature yellow crystals were deposited. The yield of crude debenzylated cis anthoric acid was 43 mg. (67% of theory), M.P. 203° C. An analytical sample was obtained by recrystallization from methanol, M.P. 203.5–204.5° C.

EXAMPLE 10

Cis 8-Chloro-5-Hydroxy-1,2,3,4,4a,9,9a,10-Octahydro-4,10-Dioxo-2-Anthraldehyde A mixture of 200 mg. (0.65 mmole) of cis 8-chloro-5-hydroxy - 1,2,3,4,4a,9,9a10 - octahydro-4,10-dioxo-2-anthroic acid and 0.2 ml. of oxalyl chloride in 15 ml. of dry benzene was refluxed for one hour. The clear yellow solution was cooled to room temperature and concentrated in vacuo to a yellow oil. This crude acid chloride was dissolved in 20 ml. of toluene and 100 mg. of 5% palladium on barium sulfate was added. Hydrogen was passed into the reaction mixture at a vigorous rate while the reaction mixture was refluxed. After one hour, 87% of theory of hydrochloric acid had been evolved. The reaction mixture was cooled, flushed with nitrogen, and the catalyst filtered off. The pale yellow filtrate was washed with water, dried over anhydrous magnesium sulfate, and concentrated in vacuo to a yellow crystalline solid. The yield of the cis 2-anthraldehyde was 100 mg., M.P. 163° C.

What is claimed is:
1. A compound of the formula:

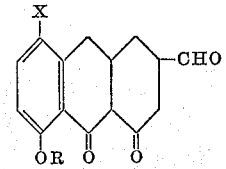

wherein X is selected from the group consisting of chlorine and bromine, and R is selected from the group consisting of hydrogen, lower alkyl and phenyl lower alkyl.

2. 8 - chloro - 5 - hydroxy-1,2,3,4,4a,9,9a,10-octahydro-4,10-dioxo-2-anthraldehyde.

References Cited in the file of this patent

UNITED STATES PATENTS

| | | |
|---|---|---|
| 2,517,709 | Pelton | Aug. 8, 1950 |
| 2,519,708 | Schlapfer et al. | Aug. 22, 1950 |
| 2,692,270 | Beavers | Oct. 19, 1954 |
| 2,841,592 | Longley et al. | July 1, 1958 |
| 3,013,063 | Fields et al. | Dec. 12, 1961 |

OTHER REFERENCES

Wagner et al.: Synthetic Organic Chemistry, pages 291 and 546 (1953).